United States Patent [19]

Hurd

[11] Patent Number: 4,458,760

[45] Date of Patent: Jul. 10, 1984

[54] OIL RECOVERY PROCESS FOR STRATIFIED HIGH SALINITY RESERVOIRS

[75] Inventor: Billy G. Hurd, Dallas, Tex.

[73] Assignee: Mobil Oil Corporation, New York, N.Y.

[21] Appl. No.: 484,088

[22] Filed: Apr. 11, 1983

[51] Int. Cl.³ .................................. E21B 43/22
[52] U.S. Cl. ........................ 166/273; 166/269
[58] Field of Search ............... 166/274, 273, 252, 269, 166/245

[56] References Cited

U.S. PATENT DOCUMENTS

| | | | |
|---|---|---|---|
| 3,908,764 | 9/1975 | Harvey | 166/273 X |
| 3,915,230 | 10/1975 | Flournoy et al. | 166/273 X |
| 4,143,716 | 3/1979 | Kalfoglou et al. | 166/273 X |
| 4,160,480 | 7/1979 | Schievelbein et al. | 166/269 |
| 4,161,218 | 7/1979 | Varnon et al. | 166/269 |
| 4,161,982 | 7/1979 | Schievelbein et al. | 166/269 |
| 4,161,983 | 7/1979 | Schievelbein | 166/269 |
| 4,165,785 | 8/1979 | Schievelbein | 166/274 |
| 4,184,549 | 1/1980 | Schievelbein | 166/269 |
| 4,194,564 | 3/1980 | Schievelbein | 166/274 |
| 4,274,488 | 6/1981 | Hedges et al. | 166/273 |
| 4,307,782 | 12/1981 | Schievelbein | 166/274 |
| 4,421,168 | 12/1983 | Hurd | 166/273 |

*Primary Examiner*—Stephen J. Novosad
*Attorney, Agent, or Firm*—Alexander J. McKillop; Michael G. Gilman; James P. O'Sullivan, Sr.

[57] ABSTRACT

There is provided a process for improving oil recovery from stratified reservoirs by (1) injecting low saline water to reduce the salinity in high permeability zones, (2) injecting a surfactant solution into the high permeability zones, (3) injecting high salinity water into the reservoir, thereby forming a surfactant/water/oil emulsion which reduces effective brine permeability in the high permeability zones, and (4) continuing to inject high salinity water into the reservoir, whereby water is diverted to low permeability zones and oil is recovered from the low permeability zones. Low salinity water may then be injected to break-up or release the emulsion in the high permeability zones and to recover oil from the high permeability zones.

20 Claims, 1 Drawing Figure

OIL RECOVERY PROCESS FOR STRATIFIED HIGH SALINITY RESERVOIRS

BACKGROUND OF THE INVENTION

This invention relates to a process for improving oil recovery from stratified reservoirs.

Brine-tolerant surfactants may be injected at a salinity such that viscous emulsions or microemulsions are promoted by mixing of surfactant solution with crude oil and formation brine. (Note U.S. Pat. Nos. 4,160,480; 4,161,218; 4,161,982; 4,161,983; 4,165,785; 4,184,549; 4,194,564; and 4,307,782, the entire disclosures of which are expressly incorporated herein by reference.) For example, U.S. Pat. No. 4,307,782 teaches injection of surfactant solution at a salinity 5 to 20 percent below that necessary for partitioning greater than 50 percent of surfactant from brine solutions into an oil phase, or into an oil-water interface. In the process, the partitioning occurs when the lower salinity surfactant solution mixes with the higher salinity formation brine. It has been observed that these surfactants and emulsions formed from them are very difficult to propagate at salinities conducive to forming the microemulsion phases. The method proposed in U.S. Pat. No. 4,307,782 depends upon injection of lower salinity brine to release phase trapped surfactant and emulsions—advancing them by a series of steps in which emulsions are formed in the front mixing zone, trapped, released by lower salinity drive, advanced, reformed by front mixing, etc.

When brine tolerant surfactants, e.g., alkyl- and alkylarylpolyethoxysulfonates or sulfates, sometimes in combination with non-ionic surfactants or petroleum sulfonates, are injected into stratified reservoirs according to the teachings of the above-mentioned patents, emulsion phases are immediately formed which increase flow resistance in strata penetrated by them. Because high permeability strata accept relatively more of injected fluids, and because such surfactants and emulsion phases propagate more readily in high permeability zones, flow resistances are increased relatively more in the high permeability zones.

An objective of this invention is to provide salinity control measures to (1) improve the rate and depth of penetration by surfactant/polymer solutions into high permeability zones, and (2) to retain viscous emulsions within the high permeability zones while subsequently injected waters are diverted into the lower permeability zones.

SUMMARY OF THE INVENTION

According to one aspect of the invention, there is provided an improved method for recovering oil from a subterranean formation having at least one high permeability zone and at least one low permeability zone, whereby, when water is injected into said formation through an injection means in a waterflood process, said water tends to channel through said high permeability zone or zones to a recovery means avoiding said low permeability zone or zones and leaving non-displaced oil in said low permeability zone or zones, the improvement for recovering oil comprising the steps of:
(i) injecting into said formation a sufficient amount of relatively low salinity water having a sufficiently low salinity to reduce the salinity of the formation fluids of said high permeability zone or zones;
(ii) injecting into said formation treated according to step (i) a surfactant slug, the salinity of said surfactant slug being sufficient to permit said surfactant to permeate into said high permeability zone or zones; and
(iii) injecting into said formation treated according to step (ii) a relatively high salinity water slug having a salinity higher than the salinity of the surfactant slug of step (ii), whereby the following takes place:
  (a) the interaction of fluids in the high permeability zone or zones causes the high permeability zone or zones to become less permeable to said relatively high salinity water of step (iii), whereby such relatively high salinity water is diverted to said low permeability zone or zones; and
  (b) oil in said low permeability zone or zones is displaced towards a recovery means by said relatively high salinity water and is recovered at said recovery means.

According to another aspect of the invention, there is provided a method for recovering oil from a subterranean formation by injecting fluid through an injection means and recovering oil-containing fluid through a recovery means, said formation having at least one high permeability zone and at least one low permeability zone, said method comprising the steps of:
(i) decreasing the salinity of the formation fluid in said high permeability zone or zones by injecting into said formation a sufficient amount of surfactant-free water having a salinity less than the salinity of the formation fluid in said high permeability zone or zones;
(ii) permeating said high permeability zone or zones with a microemulsion surfactant slug by injecting said microemulsion surfactant slug into the formation treated according to step (i), the interaction of formation fluids with said surfactant slug being insufficient to generate substantial permeability reducing macroemulsion in said high permeability zone or zones, provided that such generation of permeability reducing macroemulsion would have occurred if step (i) was omitted;
(iii) generating substantial permeability reducing macroemulsion in said high permeability zone or zones by injecting a sufficient amount of relatively high salinity water into said formation treated according to step (ii), whereby said relatively high salinity water is diverted to said low permeability zone or zones;
(iv) recovering oil from said low permeability zone or zones by continuing to inject a sufficient amount of relatively high salinity water into the formation treated according to step (iii), whereby oil in said low permeability zone or zones is displaced through said recovery means;
(v) recovering oil from said high permeability zone or zones by injecting relatively low salinity water into said formation treated according to step (iv), whereby phase trapped emulsions are released and oil is displaced through said recovery means.

According to another aspect of the invention, there is provided a process for recovering petroleum from an underground permeable reservoir having at least one high permeability zone and at least one low permeability zone, wherein the reservoir is penetrated by at least one injection well and at least one spaced-apart production well, said wells being in fluid communication with said reservoir, and wherein the reservoir contains a brine with from 50 to 220 kg/m$^3$ salinity, said process comprising the steps of:
(i) injecting into said reservoir a sufficient amount of relatively low salinity, surfactant-free water having a sufficiently low salinity to reduce the salinity of the reservoir fluids of said high permeability zone or zones;

(ii) injecting into said reservoir treated according to step (i) a surfactant solution wherein the surfactant is selected from the group consisting of an alkylarylpolyalkoxy sulfate, an alkylarylpolyalkoxyalkyl sulfonate, an alkylpolyalkoxy sulfate, an alkylpolyalkoxyalkyl sulfonate, and mixtures thereof, said surfactant being of the formula

and/or

where $R_1$ is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms, $OR_2$ is ethoxy, propoxy or mixtures thereof (e.g., a mixture of ethoxy and propoxy with relatively more ethoxy than propoxy), m is a number from 1 to 12, $R_3$ is a $C_1$ to $C_6$ alkyl (substituted or unsubstituted) and $M^+$ is a cation, said surfactant exhibiting phase stability when mixed with small amounts of crude oil or distilled fractions thereof and a brine, said surfactant solution having a salinity less than that of the reservoir brine and comprising from about 0.05 to 10.0 percent by weight of said surfactant of formula I and/or II, the salinity of the surfactant solution being from 5 to 20 percent less than the salinity required to produce partitioning of from 40 to 60 percent of the surfactant solution out of the aqueous phase and into the oil and emulsion phases;

(iii) injecting into said reservoir treated according to step (ii) a sufficient amount of relatively high salinity water sufficient to produce partitioning of at least 40 percent of the surfactant solution in the reservoir out of the aqueous phase and into the oil and emulsion phases and to recover petroleum via the production well from said low permeability zone or zones; and (iv) injecting into said reservoir treated according to step (iii) relatively low salinity water having a salinity of less than or equal to the salinity of the surfactant solution of step (ii) to recover petroleum from the high permeability zone or zones via the production well.

DETAILED DESCRIPTION

Figure 1:
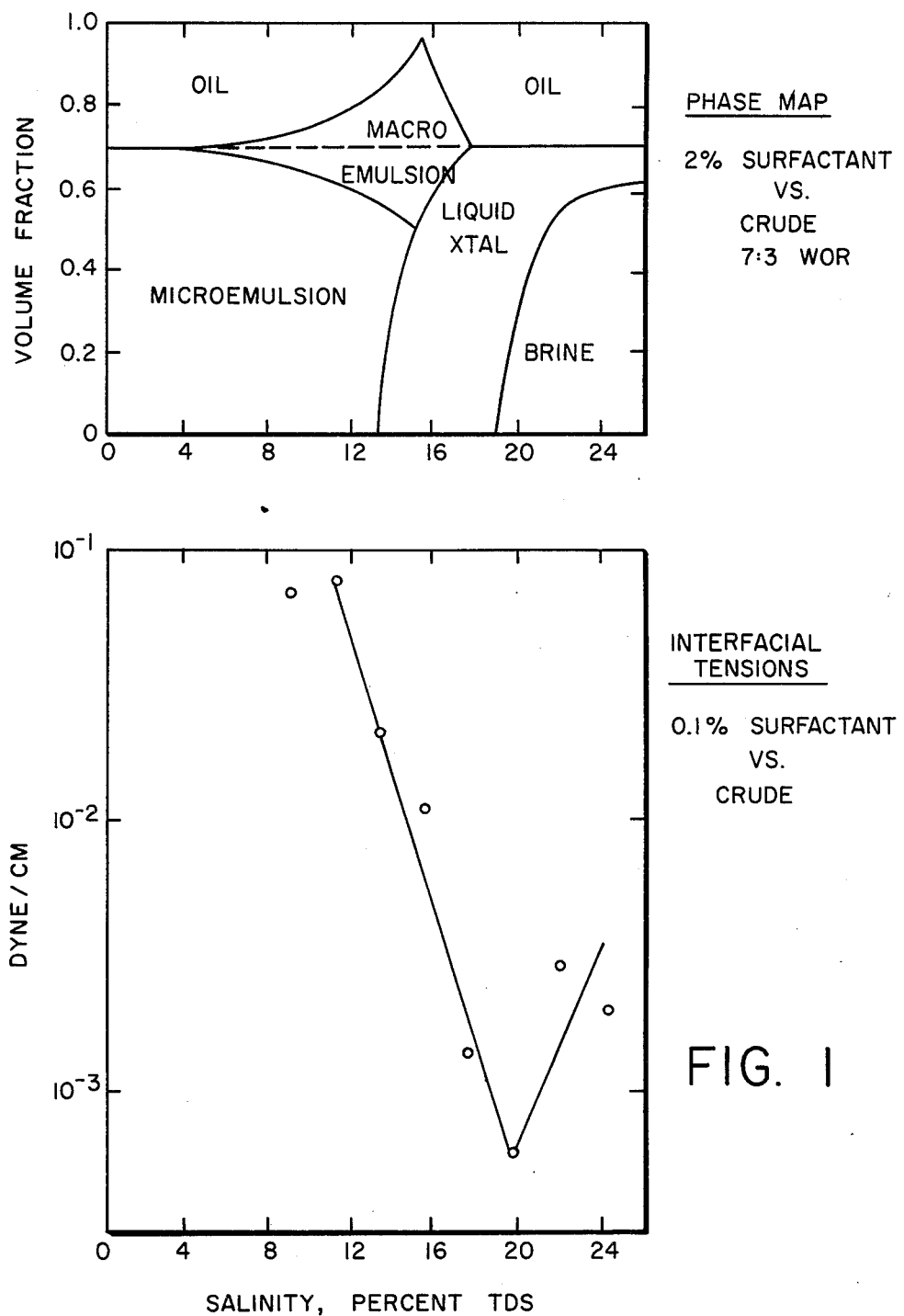
FIG. 1 provides graphs which summarize phase behavior and interfacial tensions for a particular surfactant.

The individual stratum associated with various sedimentary deposits within facies can have a wide degree of variability with respect to permeability by waterflooding. Consequently, water may tend to channel through high permeability strata or stringers. When a thin section of low permeability strata is sandwiched in between relatively thick sections of high permeability strata, oil may be displaced during waterflood from the thin section of low permeability strata by crossflow between the high permeability strata. However, such cross flow may not occur to an appreciable extent if the section of low permeability strata is sufficiently thick. Furthermore, when relatively thick sections of low permeability strata, e.g., the entire thickness of a particular facies, sandwich a central section, e.g., also corresponding to an entire facies, of high permeability strata, injected water will tend to channel through the central high permeability strata, substantially avoiding the outer low permeability strata.

Accordingly, it will be understood that the term "zone" as used herein shall refer to individual stratum or adjacent strata composites. Thus, a zone may be as thin as an individual stratum or stringer or may be, e.g., as thick as an entire facies.

The process of the present invention utilizes surfactant solutions to increase flow resistance in high permeability strata, thereby diverting subsequently injected fluids (e.g., water) to low permeability zones to improve reservoir conformance or volumetric sweep efficiency. The process also utilizes control over injection water salinity to control advance and retention of surfactant solutions in the high permeability zones.

The process of the present invention is expected to be used principally to improve oil recovery by secondary waterflooding from highly stratified oil reservoirs where volumetric sweep efficiency is poor.

An example of a process disclosed herein utilizes (1) a pre-flush of the higher permeability strata with low salinity brine to reduce the rate of mixing of surfactant solution with higher salinity formation brine, thereby improving rate and depth of penetration of surfactant/polymer into high permeability zones; (2) injection of surfactant/polymer solutions in the lower range of salinity at which emulsion formation is promoted; (3) injection of higher salinity brine to promote mixing, emulsification and trapping of surfactant emulsions in the high permeability zones, wherein high salinity brine injection is continued long enough to waterflood oil from low permeability zones; and (4) injection of lower salinity brine or polymer solution to release phase trapped emulsions and displace remaining oil from high permeability zones. Optionally, Steps 2–4 may be repeated. Also optionally, polymer may be omitted in Step 2 if the salinity of the surfactant solution is further reduced.

By way of illustration, reference is made to FIG. 1, which summarizes phase behavior and interfacial tensions at 176° F. for a particular surfactant which could be utilized as a surfactant in a reservoir. This surfactant is octylphenoxytriethoxypropane sulfonate, sodium salt. The salinity scale in FIG. 1 refers to mixed brines obtained by mixing high salinity formation brine (24 percent TDS) and low salinity injection brine (2.2 percent TDS) in different proportions. Compositions of these brines are shown in Table I.

TABLE I

| Brine Compositions (mg/l) | | |
|---|---|---|
| | LOW SALINITY BRINE | HIGH SALINITY BRINE |
| NaCl | 16,300 | 168,500 |
| CaCl$_2$ | 3,500 | 62,900 |
| MgCl$_2$ | 900 | 10,200 |
| Na$_2$SO$_4$ | 1,500 | 300 |
| TDS | 22,200 | 241,900 |

The phase map and interfacial tension data show that surfactant is partitioned into the oil-water interface at salinities higher than about 11 percent TDS, that strong stable emulsions are promoted in a salinity range from about 11 to 15 percent, that dispersed liquid crystals exist in the aqueous surfactant over the salinity range about 14 to 19 percent, and that water is expelled from the surfactant brine solution to form a condensed surfactant-rich phase above about 20 percent salinity. This surfactant does not partition into the oil to form an upper-phase microemulsion.

Experimental core floods have shown that octylphenoxytriethoxypropane sulfonate, sodium salt surfactant/pentanol solutions, containing 1% by weight surfactant and 0.3% by weight n-pentanol, displace oil effectively when injected at salinities between 15 and 20 percent, as expected from phase behavior and interfacial tensions. Flow resistances developed via surfactant/polymer injection increase with salinity, indicating increased trapping of emulsion and microemulsion phases, as expected and as desired for a floodwater diverting process. However, these experimental core floods show that surfactant transport at 19.8 percent salinity is not practical because of phase trapping, and that a mobility drive polymer (e.g., 0.1% by weight of a xanthan polysaccharide biopolymer) would be required to effectively transport the surfactant at 15.4 percent salinity, even in high permeability strata.

Transporting the surfactant under salinity conditions in which emulsification is strongly promoted is particularly difficult in the absence of a polymeric mobility control agent.

A remedy for this problem is to transport surfactant solution under low salinity conditions under which emulsification is not promoted, and rely upon mixing with more saline brines deep within the reservoir to promote emulsification—and increase flow resistances in the most permeable strata.

The present process, therefore, for improving volumetric sweep efficiency in a stratified high salinity oil reservoir, may involve the following steps:

(1) Preflush with enough low salinity brine to reduce the salinity in high permeability strata below that in which strong emulsification or partitioning of the surfactant to be used occurs. With an example reservoir and octylphenoxytriethoxypropane sulfonate, sodium salt surfactant, the preflush brine should be lower in salinity than about 11 percent TDS; as indicated by the phase behavior, IFT data in FIG. 1. Desirably, the preflush salinity should be low enough that, when mixed with an equal volume of connate brine, the resulting salinity would be about equal the salinity needed for emulsification and IFT lowering. The volume of the preflush will depend upon the permeability contrast, vertical permeability and salinity contrast between preflush brine and connate brine. Practically, the preflush should be at least 50 percent of the composite pore volume of all strata with permeability greater than 100 md, within the reservoir region being flooded, and would desirably be greater than 100 percent of this high permeability pore volume (HPPV).

(2) Inject surfactant/polymer solution at a salinity in the lower half of the salinity range in which emulsification and partitioning occurs. In the above example, the surfactant/polymer should be injected at a salinity between about 11 and 16 percent, desirably near the lower end of this range. Surfactant concentration should be in the range 0.1 to 5 percent by weight, desirably 0.5 to 2 percent. Water soluble polymer concentration should be high enough to provide a viscosity of 10 to 100 cp at the reservoir temperature. For a xanthan polysaccharide biopolymer, the concentration would generally be 1000 to 3000 ppm. Volume of the surfactant/polymer solution should be at least 25 percent of the composite high permeability pore volume, and would desirably be 50 to 100 percent of this HPPV.

Alternative Step (2)

If no polymer is used to aid transport of surfactant into the high permeability strata, salinity of the surfactant solution should be within the range of about +20 percent of the salinity at which surfactant begins to partition into or emulsify the oil (that is, in the range of about 9 to 13 percent salinity in this example) where 11 percent salinity is taken as the salinity for onset of partitioning into the oil/brine interface. Surfactant concentration and slug volumes are similar to those employed in Step 2, which included polymer in the slug.

(3) Inject brine within the salinity range needed for emulsification or partitioning (in the range 11 to 20 percent salinity in this example, desirably within the range of 12 to 16 percent) and continue long enough to displace oil from lower permeability strata by floodwater diversion. It is noted that cross flow of high salinity formation brine from low permeability zones to high permeability zones promotes desired salinity conditions for further emulsification and phase trapping in the high permeability zones. Normally, economic factors (producing oil/water ratios, especially) will dictate duration of high salinity brine injection.

(4) Inject low salinity brine or polymer solution to release phase trapped emulsions and displace oil from the high permeability strata. Salinity of this final drive should be lower than that required for partitioning of surfactant into oil/water interfaces or emulsification (less than 11 percent salinity in this example), and desirably lower than 50 percent of this salinity.

The present invention may be carried out utilizing injection and production systems as defined by any suitable arrangement of spaced apart injection and recovery wells in fluid communication with one another. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al patent. By the term "pore volume" as used herein, is meant that volume of the portion of the formation underlying the well pattern employed, which is described in greater detail in the Burdyn et al patent.

Examples of suitable surfactants may be selected from the group consisting of an alkylarylpolyalkoxy sulfate, an alkylarylpolyalkoxyalkyl sulfonate, an alkylpolyalkoxy sulfate, an alkylpolyalkoxyalkyl sulfonate, and mixtures thereof, said surfactant being of the formula $$R_1(OR_2)_m OSO_3^- M^+ \qquad (I)$$

and/or $$R_1(OR_2)_m OR_3 SO_3^- M^+ \qquad (II)$$

where $R_1$ is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms, $OR_2$ is ethoxy, propoxy or mixtures thereof, m is a number from 1 to 12, $R_3$ is a $C_1$ to $C_6$ alkyl and $M^+$ is a cation. However, other surfactants may be used such as substituted derivatives of the above. The injected surfactant solution may also contain other additives such as viscosifiers and cosurfactants including petroleum sulfonates, lignosulfates, and alcohols. For example, from about 0.5 to about 10.0 percent by weight of a petroleum sulfonate and/or lignosulfonate cosurfactant may be included. The surfactant solution may also contain a minimal amount of crude oil or distilled fractions thereof sufficient to stabilize the solution.

What is claimed is:

1. In a method for recovering oil from a subterranean formation having at least one high permeability zone and at least one low permeability zone, whereby, when water is injected into said formation through an injection means in a waterflood process, said water tends to channel through said high permeability zone or zones to a recovery means avoiding said low permeability zone or zones and leaving non-displaced oil in said low permeability zone or zones, the improvement for recovering oil comprising the steps of:
   (i) injecting into said formation a sufficient amount of relatively low salinity water having a sufficiently low salinity to reduce the salinity of the formation fluids of said high permeability zone or zones;
   (ii) injecting into said formation treated according to step (i) a surfactant slug, the salinity of said surfactant slug being sufficient to permit said surfactant to permeate into said high permeability zone or zones; and
   (iii) injecting into said formation treated according to step (ii) a relatively high salinity water slug having a salinity higher than the salinity of the surfactant slug of step (ii), whereby the following takes place:
      (a) the interaction of fluids in the high permeability zone or zones causes the high permeability zone or zones to become less permeable to said relatively high salinity water of step (iii), whereby such relatively high salinity water is diverted to said low permeability zone or zones; and
      (b) oil in said low permeability zone or zones is displaced towards a recovery means by said relatively high salinity water and is recovered at said recovery means.

2. A method according to claim 1, which further comprises the additional step of:
   (iv) injecting into said formation treated according to step (iii) a relatively low salinity water slug, whereby surfactant injected according to step (ii) and oil associated therewith is displaced to said recovery means and said associated oil is recovered.

3. A method according to claim 2, wherein steps (ii)–(iv) are repeated.

4. A method according to claim 1, wherein said surfactant slug comprises from about 0.05 to about 10.0 percent by weight of a surfactant which is selected from the group consisting of an alkylarylpolyalkoxy sulfate, an alkylarylpolyalkoxyalkyl sulfonate, an alkylpolyalkoxy sulfate, an alkylpolyalkoxyalkyl sulfonate, and mixtures thereof, said surfactant being of the formula $$R_1(OR_2)_m OSO_3^- M^+ \qquad (I)$$

and/or $$R_1(OR_2)_m OR_3 SO_3^- M^+ \qquad (II)$$

where $R_1$ is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms, $OR_2$ is ethoxy, propoxy or mixtures thereof, m is a number from 1 to 12, $R_3$ is a $C_1$ to $C_6$ alkyl and $M^+$ is a cation, said surfactant exhibiting phase stability when mixed with small amounts of crude oil or distilled fractions thereof and a brine.

5. A method according to claim 4, wherein said surfactant further comprises an amount of a hydrophillic polymer sufficient to raise the viscosity of the surfactant solution to an effective level.

6. A method according to claim 1, wherein from about 0.5 to about 1.0 pore volumes, with respect to the pore volume of the high permeability zone or zones, of the surfactant slug are injected into the formation according to step (ii).

7. A method for recovering oil from a subterranean formation by injecting fluid through an injection means and recovering oil-containing fluid through a recovery means, said formation having at least one high permeability zone and at least one low permeability zone, said method comprising the steps of:
   (i) decreasing the salinity of the formation fluid in said high permeability zone or zones by injecting into said formation a sufficient amount of surfactant-free water having a salinity less than the salinity of the formation fluid in said high permeability zone or zones;
   (ii) permeating said high permeability zone or zones with a microemulsion surfactant slug by injecting said microemulsion surfactant slug into the formation treated according to step (i), the interaction of formation fluids with said surfactant slug being insufficient to generate substantial permeability reducing macroemulsion in said high permeability zone or zones, provided that such generation of permeability reducing macroemulsion would have occurred if step (i) was omitted;
   (iii) generating substantial permeability reducing macroemulsion in said high permeability zone or zones by injecting a sufficient amount of relatively high salinity water into said formation treated according to step (ii), whereby said relatively high salinity water is diverted to said low permeability zone or zones;
   (iv) recovering oil from said low permeability zone or zones by continuing to inject a sufficient amount of relatively high salinity water into the formation treated according to step (iii), whereby oil in said low permeability zone or zones is displaced through said recovery means;
   (v) recovering oil from said high permeability zone or zones by injecting relatively low salinity water into said formation treated according to step (iv), whereby phase trapped emulsions are released and oil is displaced through said recovery means.

8. A method according to claim 7, wherein steps (ii)–(v) are repeated.

9. A method according to claim 7, wherein said surfactant slug comprises from about 0.05 to about 10.0 percent by weight of a surfactant which is selected from the group consisting of an alkylarylpolyalkoxy sulfate, an alkylarylpolyalkoxyalkyl, sulfonate, an alkylpolyalkoxy sulfate, an alkylpolyalkoxyalkyl sulfonate, and mixtures thereof, said surfactant being of the formula $$R_1(OR_2)_m OSO_3^- M^+ \quad (I)$$

and/or $$R_1(OR_2)_m OR_3 SO_3^- M^+ \quad (II)$$

where $R_1$ is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms, $OR_2$ is ethoxy, propoxy or mixtures thereof, m is a number from 1 to 12, $R_3$ is a $C_1$ to $C_6$ alkyl and $M^+$ is a cation, said surfactant exhibiting phase stability when mixed with small amounts of crude oil or distilled fractions thereof and a brine.

10. A method according to claim 7, wherein said surfactant further comprises an amount of a hydrophillic polymer sufficient to raise the viscosity of the surfactant solution to an effective level.

11. A method according to claim 7, wherein from about 0.5 to about 1.0 pore volumes, with respect to the pore volume of the high permeability zone or zones, of the surfactant slug are injected into the formation according to step (ii).

12. A process for recovering petroleum from an underground permeable reservoir having at least one high permeability zone and at least one low permeability zone, wherein the reservoir is penetrated by at least one injection well and at least one spaced-apart production well, said wells being in fluid communication with said reservoir, and wherein the reservoir contains a brine with from 50 to 220 kg/m³ salinity, said process comprising the steps of:

(i) injecting into said reservoir a sufficient amount of relatively low salinity, surfactant-free water having a sufficiently low salinity to reduce the salinity of the reservoir fluids of said high permeability zone or zones;

(ii) injecting into said reservoir treated according to step (i) a surfactant solution wherein the surfactant is selected from the group consisting of an alkylarylpolyalkoxy sulfate, an alkylarylpolyalkoxyalkyl sulfonate, an alkylpolyalkoxy sulfate, an alkylpolyalkoxyalkyl sulfonate, and mixtures thereof, said surfactant being of the formula $$R_1(OR_2)_m OSO_3^- M^+ \quad (I)$$

and/or $$R_1(OR_2)_m OR_3 SO_3^- M^+ \quad (II)$$

where $R_1$ is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms, $OR_2$ is ethoxy, propoxy or mixtures thereof, m is a number from 1 to 12, $R_3$ is a $C_1$ to $C_6$ alkyl and $M^+$ is a cation, said surfactant exhibiting phase stability when mixed with small amounts of crude oil or distilled fractions thereof and a brine, said surfactant solution having a salinity less than that of the reservoir brine and comprising from about 0.05 to 10.0 percent by weight of said surfactant of formula I and/or II, the salinity of the surfactant being from 5 to 20 percent less than the salinity required to produce partitioning of from 40 to 60 percent of the surfactant solution out of the aqueous phase and into the oil and emulsion phases;

(iii) injecting into said reservoir treated according to step (ii) a sufficient amount of relatively high salinity water sufficient to produce partitioning of at least 40 percent of the surfactant solution in the reservoir out of the aqueous phase and into the oil and emulsion phases and to recover petroleum via the production well from said low permeability zone or zones; and (iv) injecting into said reservoir treated according to step (iii) relatively low salinity water having a salinity of less than or equal to the salinity of the surfactant solution of step (ii) to recover petroleum from the high permeability zone or zones via the production well.

13. A method as recited in claim 12 wherein the surfactant is an alkylarylpolyalkoxyalkyl sulfonate.

14. A method as recited in claim 13 wherein the alkoxy is ethoxy.

15. A method as recited in claim 12 wherein the surfactant is an alkylpolyethoxy sulfate.

16. A method as recited in claim 12 wherein the surfactant is a dialkylbenzenepolyethoxy sulfate.

17. The process of claim 12 wherein the surfactant solution further comprises a minimal amount of crude oil or distilled fractions thereof sufficient to stabilize the solution.

18. The process of claim 12 wherein the surfactant solution further comprises an amount of a hydrophillic polymer sufficient to raise the viscosity of the surfactant solution to an effective level.

19. The process of claim 12 wherein the surfactant solution also contains from 0.5 to 10.0 percent by weight of petroleum sulfonate.

20. The process of claim 12 wherein the surfactant solution also contains from 0.5 to 10 percent by weight of lignosulfonate.

* * * * *